(12) United States Patent
Riley et al.

(10) Patent No.: US 11,394,074 B2
(45) Date of Patent: Jul. 19, 2022

(54) BATTERY CROSS MEMBER CONFIGURATION WITH STRUCTURAL NUT CHANNEL

(71) Applicant: GM GLOBAL TECHNOLOGY OPERATIONS LLC, Detroit, MI (US)

(72) Inventors: Tyler A. Riley, Macomb, MI (US); Terry A. Swartzell, Ann Arbor, MI (US); Andrew W. White, Shelby Township, MI (US); Charles E. Jensen, Shelby Township, MI (US); James A. Rochon, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 16/709,272

(22) Filed: Dec. 10, 2019

(65) Prior Publication Data
US 2021/0175478 A1  Jun. 10, 2021

(51) Int. Cl.
*H01M 50/20*  (2021.01)
*H01M 10/04*  (2006.01)

(52) U.S. Cl.
CPC .......... *H01M 50/20* (2021.01); *H01M 10/04* (2013.01)

(58) Field of Classification Search
CPC .............................. H01M 50/20; H01M 10/04
See application file for complete search history.

(56) References Cited

U.S. PATENT DOCUMENTS

2018/0050607 A1* 2/2018 Matecki ................ H01M 50/20
2019/0326573 A1* 10/2019 Ozawa ................. H01M 50/20

* cited by examiner

*Primary Examiner* — Maria Laios
*Assistant Examiner* — Bartholomew A Hornsby
(74) *Attorney, Agent, or Firm* — Cantor Colburn LLP

(57) ABSTRACT

A battery enclosure, support beam for a battery enclosure and method of manufacturing the support beam. The battery enclosure includes a base and the support beam is securable within the base. The support beam includes a body, a nut channel secured to the body, and a mechanical fastener attached to the nut channel. The nut channel is formed into a u-shaped channel. The mechanical fastener is attached to the nut channel and the nut channel is secured to the body of the support beam.

14 Claims, 6 Drawing Sheets

BATTERY CROSS MEMBER CONFIGURATION WITH STRUCTURAL NUT CHANNEL

INTRODUCTION

The subject disclosure relates to an automobile battery enclosure, and in particular to a beam structure of an automobile battery enclosure that resists buckling under impact.

An automobile's battery is often stored within a battery enclosure in order to protect the battery from damage during a possible vehicular impact. There is a desire to reduce the weight of the battery enclosure. However, lighter materials can introduce strength and stiffness considerations, particularly for supporting members of the battery enclosure that may buckle under impact. Accordingly, it is desirable to provide a design of a support member that is lightweight, resists buckling under impact and increases bending stiffness properties of the assembled section.

SUMMARY

In one exemplary embodiment, a method of manufacturing a battery enclosure support beam is disclosed. A nut channel is formed into a u-shaped channel. A mechanical fastener is attached to the nut channel. The nut channel is secured to a body of the support beam.

In addition to one or more of the features described herein, securing the nut channel further includes laser welding the nut channel to the body. Attaching the mechanical fastener further includes welding the mechanical fastener to a nut opening of the nut channel. The body of the support beam includes a body opening, and the nut channel is secured to the body with the mechanical fastener passing through the body opening. Securing the nut channel to the body to strengthens the body at the nut channel. The body forms a rectangle in cross-section and includes a hollow interior extending along a longitudinal axis of the support beam. The support beam is secured to a base via a base support.

In another exemplary embodiment, a battery enclosure support beam is disclosed. The battery enclosure support beam includes a body, a nut channel forming a u-shape, and a mechanical fastener attached to the nut channel, wherein the nut channel is secured to the body of the support beam.

In addition to one or more of the features described herein, the nut channel is laser welded to the body. The mechanical fastener is welded to a nut opening of the nut channel. The body of the support beam includes a body opening and the nut channel is secured to the body with the mechanical fastener passing through the body opening. The nut channel strengthens the body at the nut channel. The body forms a rectangle in cross-section and includes a hollow interior extending along a longitudinal axis of the support beam. A base support secures the support beam to a base.

In yet another exemplary embodiment, a battery enclosure is disclosed. The battery enclosure includes a base and a support beam securable within the base. The support beam includes a body, a nut channel forming a u-shape, and a mechanical fastener attached to the nut channel, wherein the nut channel is secured to the body of the support beam.

In addition to one or more of the features described herein, the nut channel is laser welded to the body. The mechanical fastener is welded to a nut opening of the nut channel. The body of the support beam includes a body opening and the nut channel is secured to the body with the mechanical fastener passing through the body opening. The body forms a rectangle in cross-section and includes a hollow interior extending along a longitudinal axis of the support beam. A base support secures the support beam to a base.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
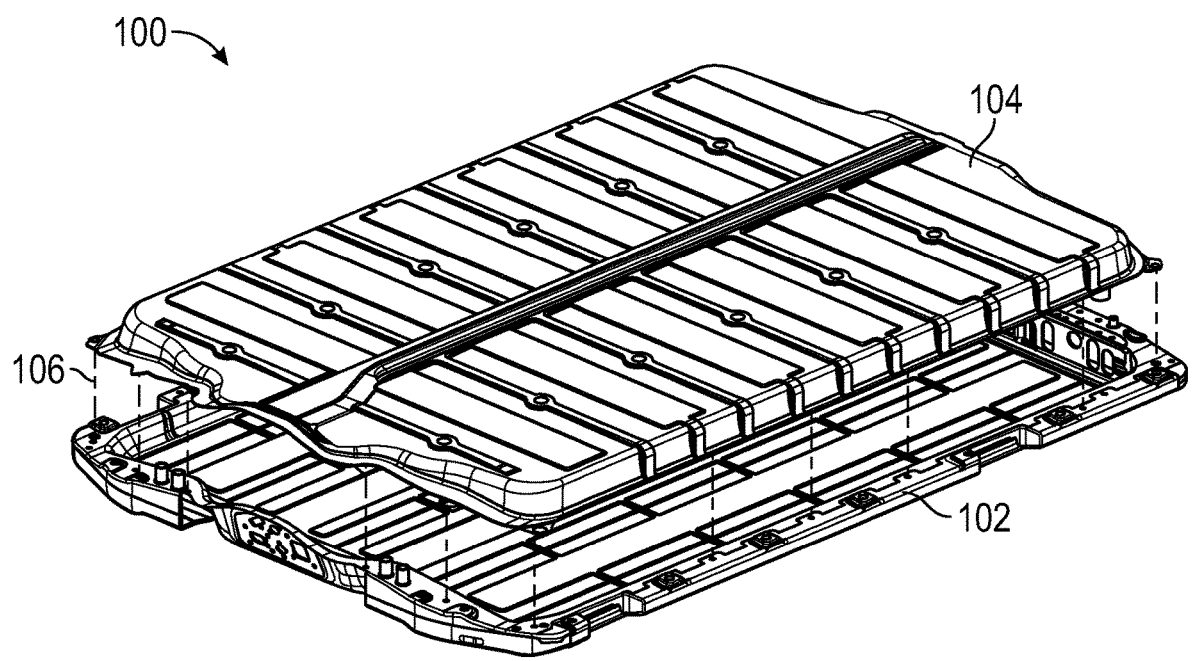
FIG. 1 shows a battery enclosure for protecting a vehicle's battery from impact.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a battery enclosure 100 for protecting a vehicle's battery assembly from impact. The battery enclosure 100 includes a base 102 and a cap 104. A battery assembly (not shown) rests on the base 102. The cap 104 is placed on top of the battery assembly. The base 102 and cap 104 are connected to each other to encapsulate the battery assembly via connection members such as rods or screws that extend along the various dotted lines 106 shown between the base 102 and the cap 104.

Figure 2:
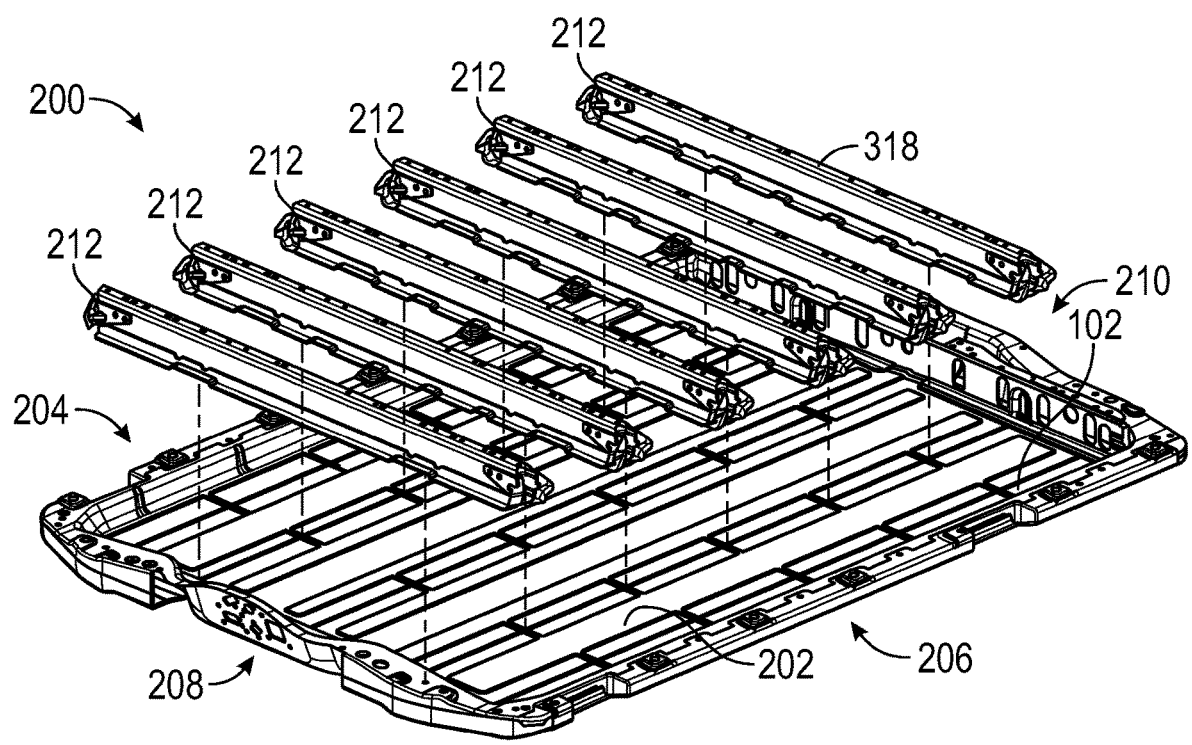
FIG. 2 shows a disassembled perspective view of the base of FIG. 1.

FIG. 2 shows a disassembled perspective view 200 of the base 102 of FIG. 1. The base 102 includes a rectangular face 202 having a first sidewall 204 and a second sidewall 206 opposite the first sidewall 204, both of which extend vertically from the face 202. The base 102 further includes a first endwall 208 and a second endwall 210 opposite the first endwall 208, both of which extend vertically from the face 202. The first sidewall 204, second sidewall 206, first endwall 208 and second endwall 210 reside along a perimeter of the face 202. A plurality of support beams 212 extend from the first sidewall 204 to the second sidewall 206. The plurality of support beams 212 support the battery assembly when it is placed on the base 102.

Figure 3:
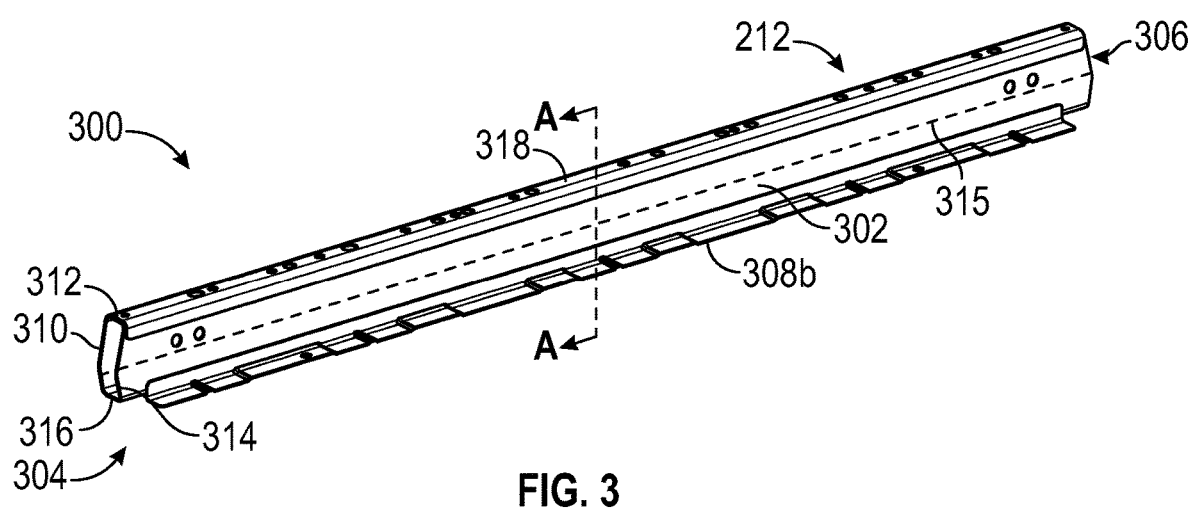
FIG. 3 shows a perspective view of a support beam of FIG. 2 used in the battery enclosure.
Figure 4:
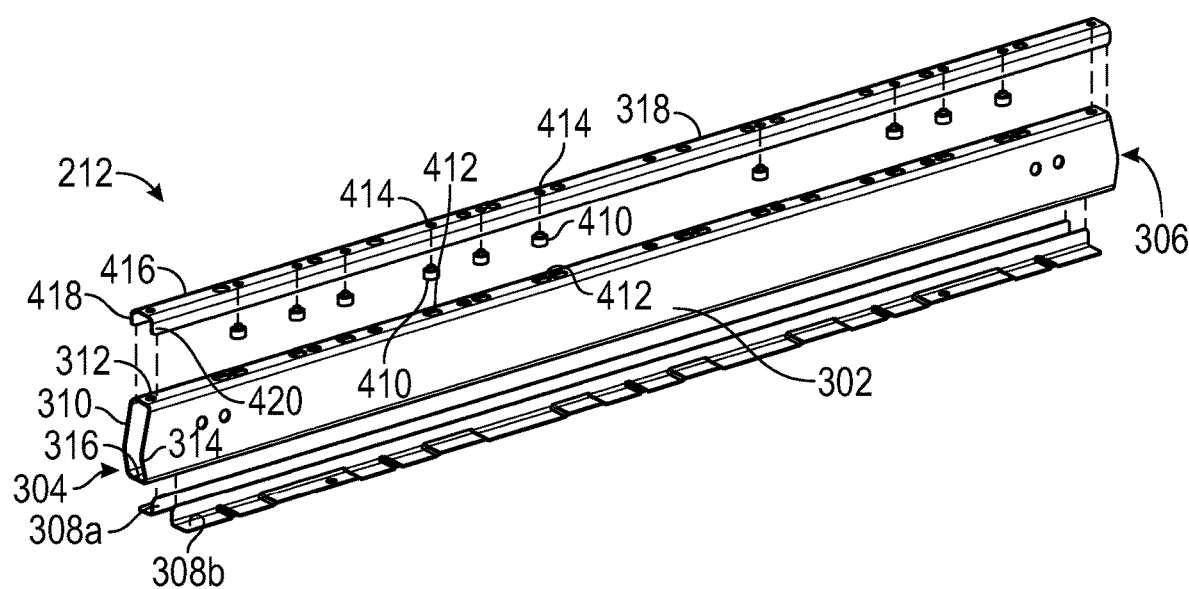
FIG. 4 shows a disassembled view of the support beam of FIG. 3.

FIG. 3 shows a perspective view 300 of a support beam 212 of FIG. 2 of the battery enclosure. The support beam 212 includes a body 302 extending from a first beam end 304 to a second beam end 306 along a longitudinal axis 315. The first beam end 304 couples to the first sidewall 204 of the base 102 while the second beam end 306 couples to the second sidewall 206 of the base 102. The body 302 includes a left body side 310, top body side 312, right body side 314 and bottom body side 316, wherein "top", "bottom", "left" and "right" are used for descriptive purposes with respect to the viewpoints shown in FIGS. 3-5. A right base support 308b is shown coupled to the body 302 near the bottom body side 316. Although not shown in FIG. 3, a left base support 308a, FIG. 4 is coupled to the body 302 near the bottom body side 316 opposite the right base support 308b. A nut channel 318 is coupled to the body 302 at the top body side 312.

FIG. 4 shows a disassembled view of the support beam 212 of FIG. 3. The body 302 is a single material that includes the left body side 310, top body side 312, right body side 314, and bottom body side 316. The rectangle has a hollow interior 502, FIG. 5 that extends from the first beam end 304 to the second beam end 306 along the longitudinal axis 315. The left base support 308a is coupled to the left body side 310 near the bottom body side 316 and a right base support 308b is coupled to the right body side 314 near the bottom body side 316.

The nut channel 318 fits over the top body side 312. The nut channel 318 is an elongated member in the form of a u-shaped channel having a base section 416 and two prongs 418 and 420. The nut channel 318 can be rolled or stamped into the u-shape, in various embodiments. The nut channel 318 has an inner surface 504, FIG. 5 that fits against the body 302 and an outer surface 506. The inner surface 504 has dimensions that match the dimensions of the outer surface of the body 302 at the top body side 312 and along the left body side 310 and right body side 314.

The nut channel 318 includes a plurality of nut openings 414 aligned along a longitudinal axis of the nut channel 318. A plurality of body openings 412 are formed in the top body side 312 of the body 302. Each nut openings 414 has a corresponding body opening 412 at its axial location. Mechanical fasteners 410 are attached to the nut channel 318 at the nut openings 414. In various embodiments, the mechanical fasteners 410 are attached to the nut channel 318 at the nut openings 414 via a welding process. When fastened at the nut channel 318, the mechanical fasteners 410 are able to fit in or pass through their respective body openings 412 when the nut channel 318 is secured to the body 302.

Referring back to FIG. 2, when the support beam 212 is secured within the base 102, the nut channel 318 is oriented away from the face 202 and is able to secure the battery assembly within the base 102.

Figure 5:
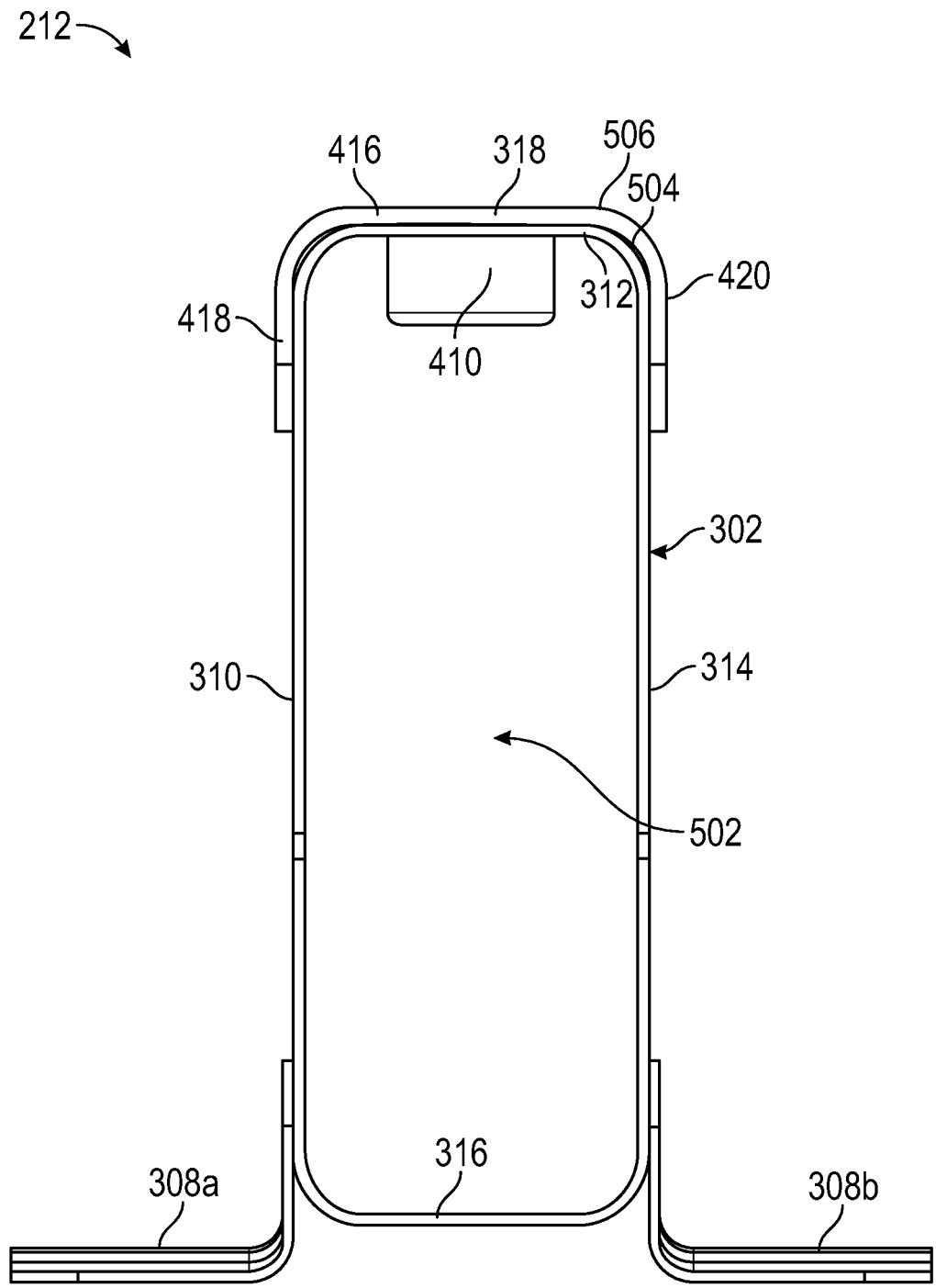
FIG. 5 shows a cross-section of the support beam of FIG. 3 in an illustrative embodiment.

FIG. 5 shows a cross-section of the support beam 212 of FIG. 3 in an illustrative embodiment. The left body side 310, top body side 312, right body side 314, and bottom body side 316 form, in cross-section, a rectangle having rounded corners. The thickness of the wall of the body 302 (i.e., any of left body side 310, top body side 312, right body side 314 and bottom body side 316) is about 1 millimeter (mm). The body 302 can be made of ultra-high strength steel via steel rolling, for example. The left base support 308a and right base support 308b are made of a high-strength low alloy steel and has a thickness of about 1.0 mm via a stamping process. The nut channel 318 can be made of an ultra-high strength steel with a thickness of about 1.5 mm, via a rolling process. The support beam 212 has a height of about 97 mm, and the body 302 has a height of about 92.5 mm. A thickness of the body 302 as measured from outer surfaces of the left body side 310 and the right body side 314 is about 32 mm. A thickness of the nut channel 318 as measured between outer surfaces of the prongs 418 and 420 is about 35.5 mm. In various embodiments, mechanical fastener 410 can be a nut, such as an M6 weld nut.

Welding the nut channel 318 to the top body side 312 strengthens the body 302 at the top body side 312, thereby reducing buckling under a load at the top body side 312 in comparison to the top body side 312 without the nut channel 318. Similarly, the left base support 308a and right base support 308b strengthen the body 302 at the bottom body side 316, thereby reducing buckling under a load at the bottom body side 316 in comparison to the bottom body side 316 without the left base support 308a and right base support 308b. The top nut channel 318 and base supports 308a and 308b, being located at opposite ends of the cross-section shown in FIG. 5, increase the moment of inertia of the cross-section, thereby increasing a bending stiffness of the cross-section.

Figure 6:
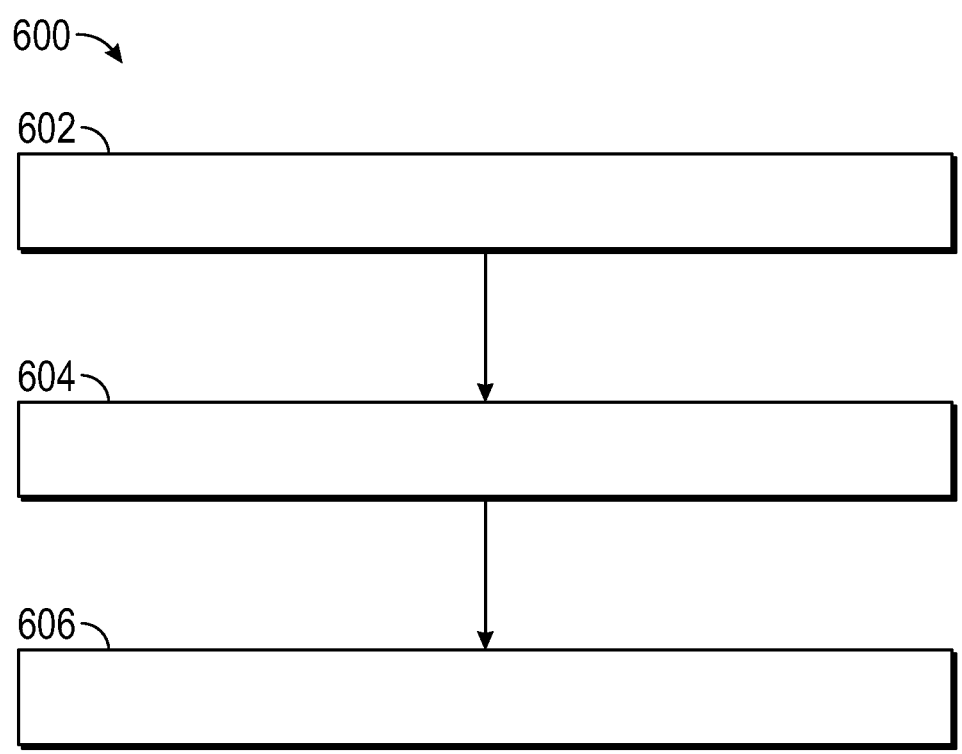
FIG. 6 shows a flowchart illustrating a method of manufacturing a support beam for a battery enclosure.

FIG. 6 shows a flowchart 600 illustrating a method of manufacturing a support beam for a battery enclosure. In box 602, a nut channel is formed in the shape of a u-shaped channel. In box 604, mechanical fasteners are attached to the nut channel at nut openings of the nut channel at the inner surface of the nut channel. In box 606, the nut channel is secured to a body of the support beam. The nut channel can be secured via laser welding or other suitable process. The nut channel is secured with the mechanical fasteners protruding through body openings located at a top side of the body.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of manufacturing a support beam of a battery enclosure, comprising:
   forming a nut channel into a u-shaped channel;
   forming a nut opening in a base section of the nut channel;
   welding a mechanical fastener to the nut opening;
   welding the nut channel to a top body side of the support beam, the support beam extending between sidewalls of the battery enclosure;
   securing a left base support to a left body side of the support beam adjacent a bottom side of the support beam;
   securing a right base support to a right body side of the support beam adjacent the bottom side of the support beam;
   securing the left base support to the battery enclosure; and
   securing the right base support to the battery enclosure.

2. The method of claim 1, wherein welding the nut channel further comprising laser welding the nut channel to the top body side of the support beam.

3. The method of claim 1, wherein the top body includes a body opening, further comprising welding the nut channel to the top body side with the mechanical fastener passing through the body opening.

4. The method of claim 1, further comprising securing the nut channel to the body to strengthen the body at the nut channel.

5. The method of claim 1, wherein the body forms a rectangle in cross-section and includes a hollow interior extending along a longitudinal axis of the support beam.

6. A support beam, of a battery enclosure, comprising:
a body of the support beam, the body having a top body side a left body side, a right body side and a bottom body side, the support beam extending between sidewalls of the battery enclosure;
a nut channel forming a u-shape, the nut channel having base section having a nut opening formed therein; and
a mechanical fastener welded to the nut opening, wherein the nut channel is welded to the top body side;
a left base support secured to the left body side adjacent the bottom body side and to the battery enclosure; and
a right base support secured to the right body side adjacent the bottom side and to the battery enclosure.

7. The battery enclosure support beam of claim 6, wherein the nut channel is laser welded to the body.

8. The battery enclosure support beam of claim 6, wherein the top body side includes a body opening and the nut channel is welded to the top body side with the mechanical fastener passing through the body opening.

9. The battery enclosure support beam of claim 6, wherein the nut channel strengthens the body at the nut channel.

10. The battery enclosure support beam of claim 6, wherein the body forms a rectangle in cross-section and includes a hollow interior extending along a longitudinal axis of the support beam.

11. A battery enclosure, comprising: a base;
a support beam securable within the base, the support beam extending between sidewalls of the battery enclosure, the support beam comprising:
a body having a top body side a left body side, a right body side and a bottom body side;
a nut channel forming a u-shape, the nut channel having a base having a nut channel formed therein;
a mechanical fastener welded to the nut channel, wherein the nut channel is welded to the top body side;
a left base support secured to the left body side adjacent the bottom body side and to the base of the battery enclosure; and
a right base support secured to the right body side adjacent the bottom body side and to the base of the battery enclosure.

12. The battery enclosure of claim 11, wherein the nut channel is laser welded to the body.

13. The battery enclosure of claim 11, wherein the top body side includes a body opening and the nut channel is welded to the top body side with the mechanical fastener passing through the body opening.

14. The battery enclosure of claim 11, wherein the body forms a rectangle in cross-section and includes a hollow interior extending along a longitudinal axis of the support beam.

* * * * *